(12) United States Patent
Dalal

(10) Patent No.: US 7,076,615 B1
(45) Date of Patent: Jul. 11, 2006

(54) INTERVAL MATCHING CIRCUIT FOR CLASSIFICATION

(76) Inventor: Parin Bhadrik Dalal, 681 Berkshire Pl., Milpitas, CA (US) 95035-7524

( * ) Notice: Subject to any disclaimer, the term of this patent is extended or adjusted under 35 U.S.C. 154(b) by 135 days.

(21) Appl. No.: 10/947,613

(22) Filed: Sep. 22, 2004

(51) Int. Cl.
*G06F 12/00* (2006.01)

(52) U.S. Cl. ...................... 711/154; 711/167

(58) Field of Classification Search ............... None
See application file for complete search history.

(56) References Cited

U.S. PATENT DOCUMENTS

| | | | | |
|---|---|---|---|---|
| 5,654,911 A * | 8/1997 | Schwarz et al. | ............ | 708/714 |
| 5,944,778 A * | 8/1999 | Takeuchi et al. | ............ | 718/100 |
| 6,216,207 B1 * | 4/2001 | Miller et al. | ................ | 711/133 |
| 6,356,902 B1 * | 3/2002 | Tan et al. | ...................... | 707/10 |
| 6,560,587 B1 * | 5/2003 | Early | ............................ | 706/45 |
| 2002/0004710 A1 * | 1/2002 | Murao | ........................ | 702/167 |
| 2003/0004938 A1 * | 1/2003 | Lawder | ........................ | 707/3 |
| 2004/0111392 A1 * | 6/2004 | Indeck et al. | .................. | 707/1 |
| 2004/0170171 A1 * | 9/2004 | Kanekar et al. | ............ | 370/392 |
| 2004/0221311 A1 * | 11/2004 | Dow et al. | .................... | 725/52 |

* cited by examiner

*Primary Examiner*—Pierre Vital
*Assistant Examiner*—Daniel Kim

(57) ABSTRACT

An efficient interval matching circuit configured with an input search-key terminal and an output terminal. The circuit generates a value on the output terminal that uniquely identifies all the intervals matching the input search-key. The circuit's memories are configured using a sub-sampling of interval edges. Interval matching takes place using cascaded matching stages, each with higher precision, until the matching intervals are resolved. Such resolution is independent of the particular search-key presented and of the set of intervals configured.

6 Claims, 4 Drawing Sheets

INTERVAL MATCHING CIRCUIT FOR CLASSIFICATION

FEDERALLY SPONSORED RESEARCH

Not Applicable

SEQUENCE LISTING OR PROGRAM

Not Applicable

BACKGROUND

Figure 1:
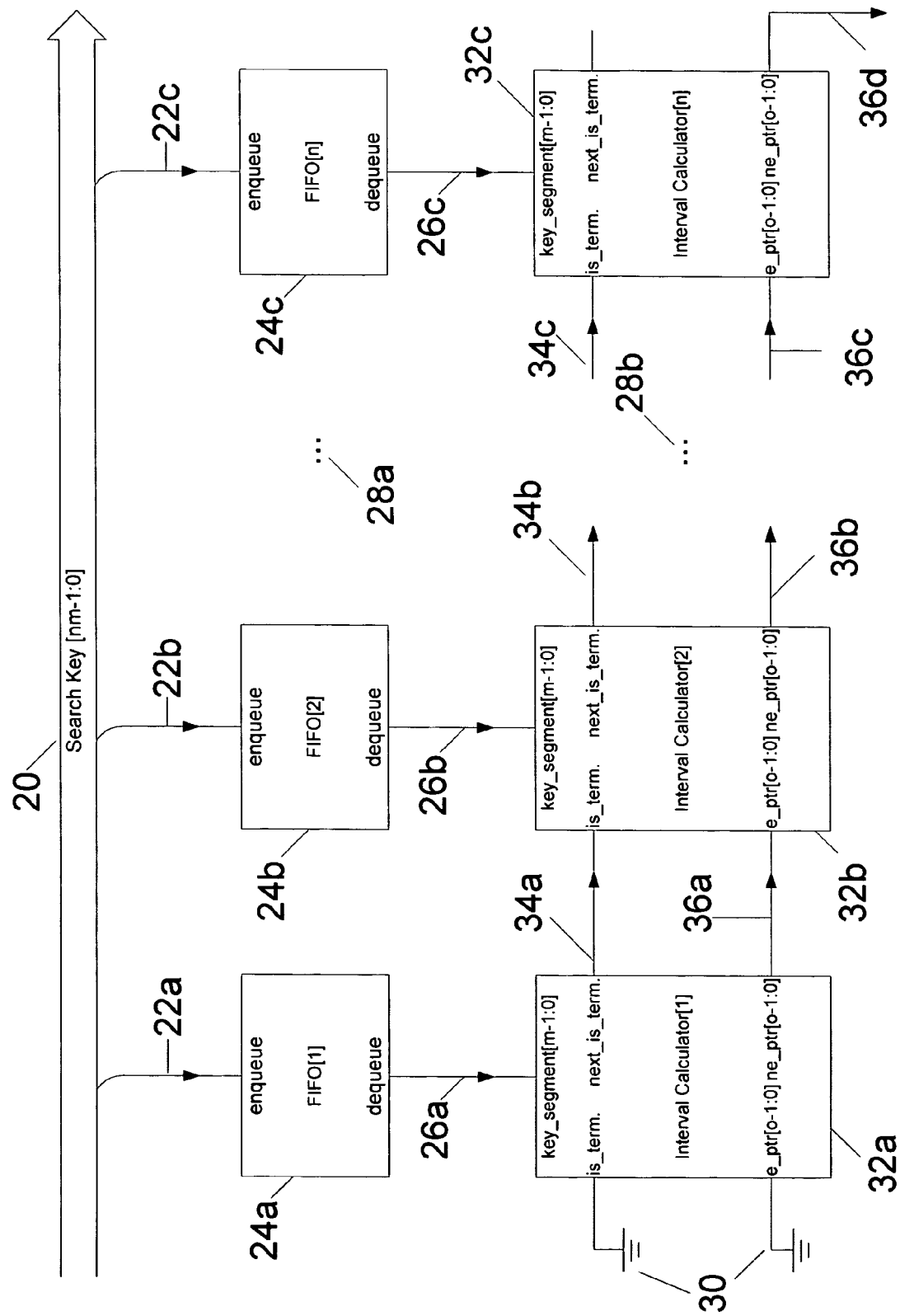

This invention improves upon integrated circuits used to perform interval matching. Interval matching hardware has many applications such as pattern and image recognition, but it is used most heavily in classification and access control algorithms for networking systems and storage systems.

In a group of networked systems, contention for common resources such as network bandwidth and stored data require the differentiation between users of the network in order to provide equitable access commensurate with users' privileges and status. In order to differentiate these accesses, network and system administrators classify requests by adminstator-chosen data fields that appear in protocols used to communicate user requests.

Administrators specify this mapping, data to classes of treatment, by a set of range specifications. When the selected data field's value, known also as the search-key, falls into a specified range, the data is considered part of the class associated with that range. Prioritization may take place between overlapping ranges and a given class may specify ranges over many fields. This function, identifying the highest priority interval to which a specific value belongs, is known as interval matching.

To implement interval matching, it is necessary to match a specified value with the highest priority interval containing that value. For example, consider an interval matching circuit configured with the rules 904a, 904b, 904c, 904d illustrated in FIG. 3. The rules are drawn in ascending priority from left to right. If a search-key of value "5" is input to this circuit, so selecting one of the sixteen values 908 possible for the key, the correct functionality requires a result signal identifying the third rule 904c. With every search-key input to the circuit, a classification identifier associated with that class must be returned. With certain restrictions, this matching scheme may be implemented with software on a general purpose computer. These restrictions are: the frequency of user requests must be low and the throughput requirements must be defined only in stochastic terms. A common algorithm for this function is known as an interval tree (See T. H. Cormen et al., "Introduction to Algorithms", The MIT Press, 1994, pp. 485–487). Such an implementation can be found in U.S. Pat. No. 6,219,667, "Efficient large-scale access control for internet/intranet information systems." However, when the application produces a high frequency of interval matching requests that require guaranteed processing time, as is the case in networking, a dedicated integrated circuit must be used.

Using prior art, implementing an interval tree in circuit form is not possible without serious limitations. Tree imbalance would turn search bandwidth statistical. Long field widths, as those seen in networking, would make the circuit's datapath width (in particular the logic comparators used to select branches for traversal) insolvable. This type of implementation creates a tradeoff between classification key width and bandwidth, preventing interval trees from scaling. The most efficient circuit-based interval tree known is presented in U.S. Pat. No. 6,633,953, "Range content-addressable memory." This approach uses a sorted boundary list to store and process the range boundaries of a rule list 904a, 904b, 904c, 904d. This approach suffers from large update times as the entire list needs to be re-sorted with the addition or deletion of a rule. Other integrated circuit approaches have been taken, but without achieving both high performance and high density (number of intervals/per unit of silicon area). Some approaches, such as ternary content addressable memory (TCAM) not only suffer from low-density and high power, but from a highly statistical capacity as well. In this case, because ranges must be represented by groups of data-mask pairs, large inner products form when several data fields must be analyzed (See Gupta, Algorithms for Routing Lookup and Packet classification, Stanford University Ph.D. Thesis, Page 135).

The work herein represents a significant advance in circuits for interval matching by simultaneously solving the problems of deterministic bandwidth and capacity, high performance and high density, and scaling to large key widths, as needed by networking applications.

OBJECTS AND ADVANTAGES

Accordingly, several objects and advantages of the present invention are:
 (a) the size of the circuit scales linearly with its capacity of intervals;
 (b) the size of the circuit scales linearly with the width of the input search-key;
 (c) the circuit forms no inner products when several fields must be analyzed;
 (d) the circuit excludes all fully-associative (fully-switching) techniques to provide the low power consumption of standard-switching logic;
 (e) the circuit services a higher frequency of interval match requests due to the pipelined nature of the implementation;
 (f) the circuit provides a constant capacity of intervals, regardless of interval values used;
 (g) the circuit services a constant capacity of interval match requests, regardless of the search-key value requested;
 (h) the circuit may be updated efficiently when rules are added or deleted, i.e. the configuration changes need may be localized to the range presented and do not require global adjustments to the circuit's configuration.

Further objects and advantages of my invention will become apparent from a consideration of the drawings and ensuing description.

SUMMARY

This invention, a scaleable and efficient interval matching circuit, uses a sampling of interval edges that progress in precision, a base and offset technique, as well as compaction between sampled Regions. The goal of this circuit is to take a search-key and map it to a value identifying the interval or intervals containing that search-key value. The circuit does not store the intervals directly, rather is stores pre-processed information about the intervals.

A programming agent does this pre-processing and configures the circuit, updating the circuit's memories whenever intervals are added or deleted. The actual interval matching occurs in a tree like fashion, with each level in the tree processed by what is termed an "interval calculator." Initially, one interval calculator will examine the entire value space, sub-sampled, for example, into 16 discrete, contiguous sections. The programming agent will have pre-processed these discrete sections by flagging any section whose value sub-space contains at least one interval edge. The circuit will count the number of flags in chronological order, until it arrives at the section whose value sub-space contains the search-key. From this count, the circuit will form an offset and add it to a base, forming a pointer to the section in which the search-key resides. The process will continue with other interval calculators, until the full precision (rather than a sub-sampled precision) of the search-key is considered. The final pointer generated will be the number identifying the interval or intervals containing the search-key value. Furthermore, during this tree traversal, a compaction scheme will force pointers into sections that have edges, even when the value falls within a section that has no interval edges in it. As such the update time is commensurate only with the sub-tree of sections in which the key resides, not the total number of intervals. The result is a capacity-deterministic (does not change with any selection of intervals), speed-deterministic, compact, scalable, high bandwidth, and easily updated interval match circuit.

DRAWINGS

Drawing Figures

In the drawings, closely related elements have the same numeral but different alphabetic suffixes.

FIG. 1 shows a top level block diagram illustrating the operation and construction of the invention. The figure illustrates how the search-key enters a queuing mechanism, how the interval calculators interconnect, as well as how signals flow between these higher level blocks.

Figure 2:
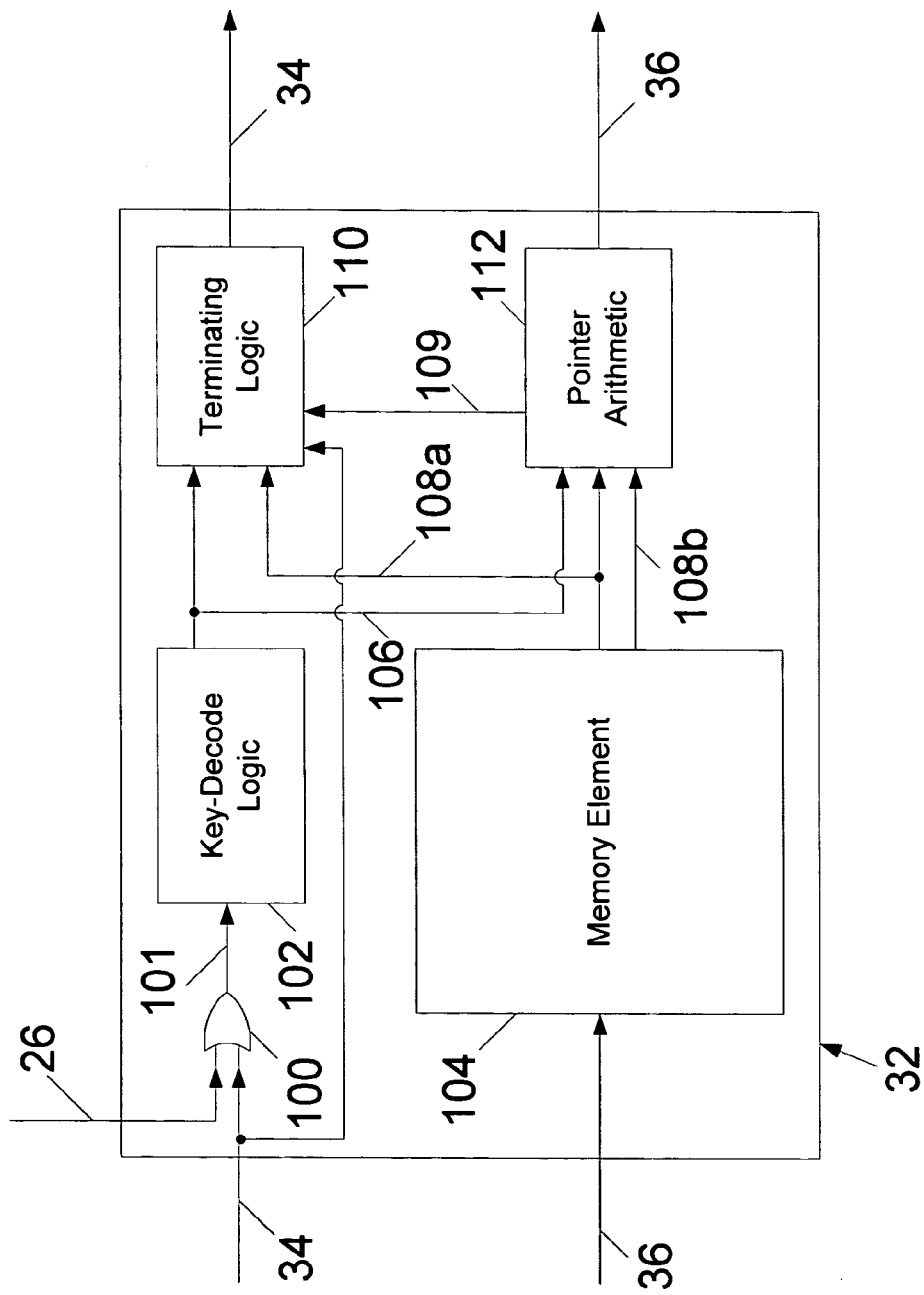

FIG. 2 diagrams the logical organization of a single interval calculator, the logic and memory within the block, and how these elements interconnect.

Figure 3:
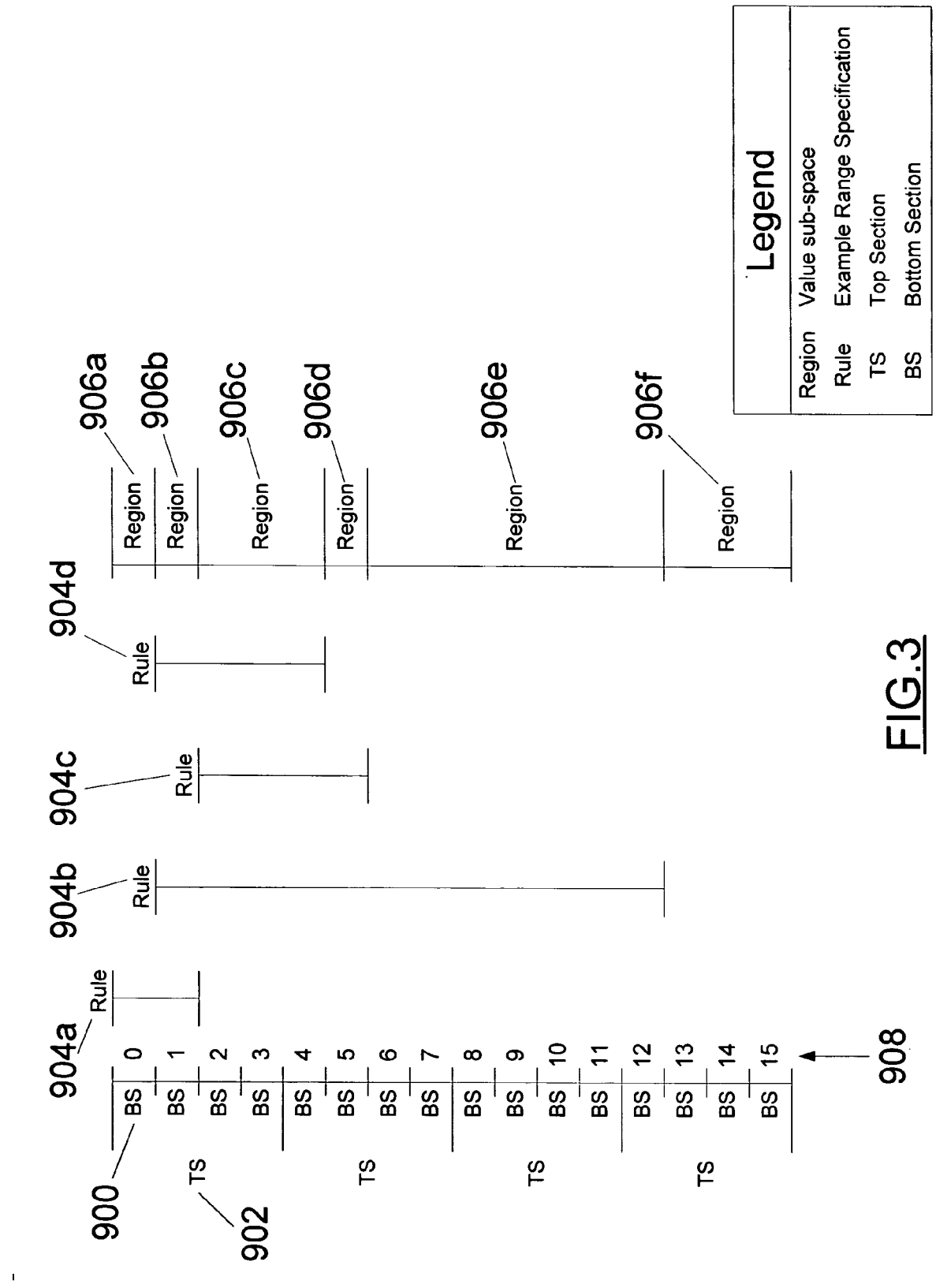

FIG. 3 shows an example of a set of range specifications and how they will be pre-processed to configure this circuit. This disclosure uses this example to illustrate how memories in the interval matching circuit would be configured in the Operation section. The example uses n equal to 2, m equal to 2, and k equal to 4.

Figure 4:
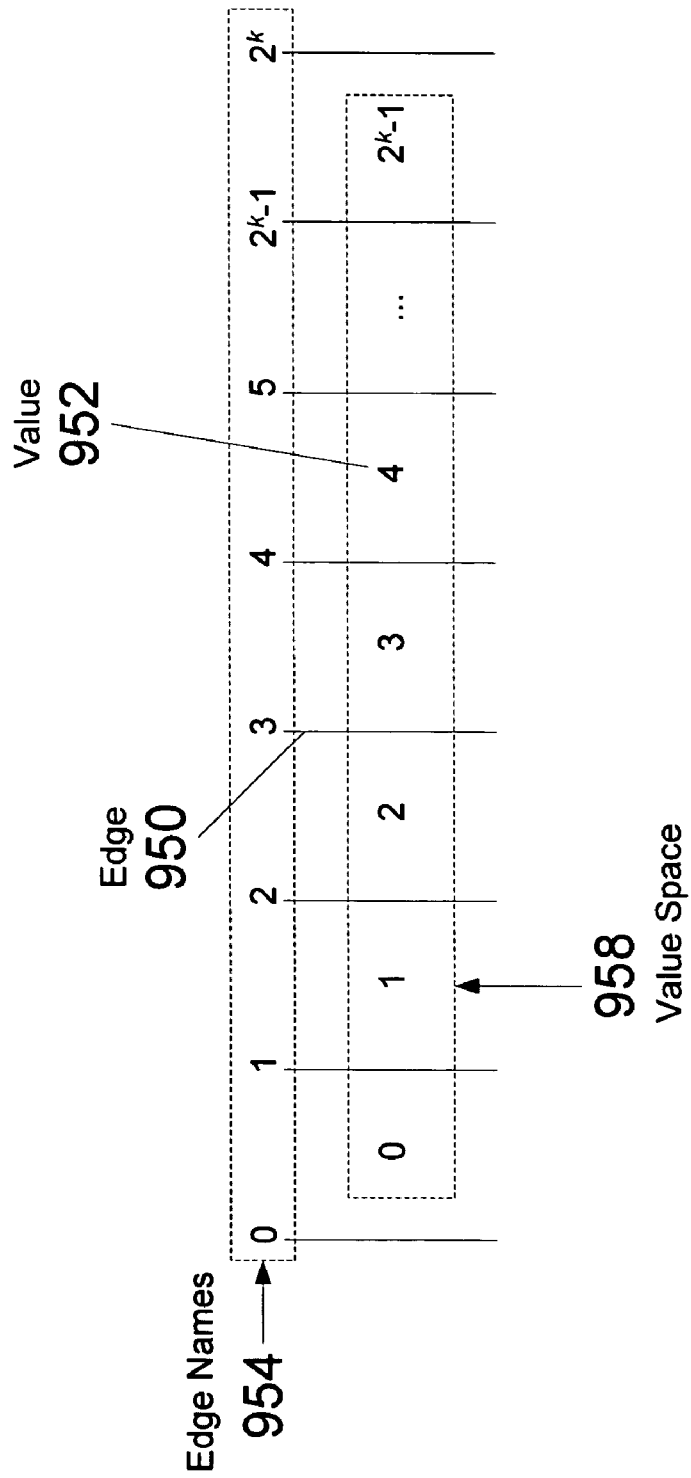

FIG. 4 illustrates the naming convention used in this disclosure to label the boundaries formed within the search-key's value space. In particular, this diagram relates edge names to the particular values they divide.

REFERENCE NUMERALS IN DRAWINGS 20 search_key[nm−1:0] A bus of k-bits width, representing the search-key input to the interval matching circuit
22a search_key[nm−1:n(m−1)] A bus of m-bits width, representing the most significant m-bits input to the circuit
22b search_key[n(m−1)−1:n(m−2)] A bus of m-bits width, representing the second segment of the search-key bus input to the interval matching circuit
22c search_key[m−1:0] A bus of m-bits width, representing the least significant m-bits input to the circuit
24a A depth configurable FIFO that delays the first key segment by a configured amount
24b A depth configurable FIFO that delays the second key segment by a configured amount
24c A depth configurable FIFO that delays the n-th key segment by a configured amount
26 A general representation of any one of the possible key segments
26a A first key segment delayed by the first FIFO
26b A second key segment delayed by the second FIFO
26c An n-th key segment delayed by the n-th FIFO
28a Symbol for other FIFOs not shown from segment 3 to segment n−1
28b Symbol for other interval calculators not shown from segment 3 to segment n−1
30 Ground busses connecting to the first interval calculator's is_terminating flag and entry_ptr flag
32 A general representation of any one of the possible interval calculators
32a A first interval calculator accepts inputs o-bit entry_ptr and a single bit is_terminating flag, as well as the first delayed key segment, to produce the next entry_ptr o-bit bus and the next_is_terminating flag; the variable o is defined in the Detailed Description section
32b A second interval calculator
32c An n-th interval calculator
34 A general representation of any one of the possible next_is_terminating flags or is_terminating flags
34a A next_is_terminating flag, output from the first interval calculator, input to the second interval calculator's is_terminating input terminal
34b A next_is_terminating flag, output from the second interval calculator, chained to the input of the next interval calculator's is_terminating input terminal
34c A next_is_terminating flag, output from the [n−1]-th interval calculator, input to the final, n-th interval calculator's is_terminating input terminal
36 A general representation of any one of the possible next_entry_ptr or entry_ptr busses
36a A next_entry bus of o-bit width, output from the first interval calculator, input to the second interval calculator's entry_ptr terminal
36b A next_entry bus of o-bit width, output from the second interval calculator, chained to the input to the next interval calculator's entry_ptr terminal
36c A next_entry bus of o-bit width, output from the [n−1]-th interval calculator, input to the final n-th interval calculator
36d A final result whose unique value represents all matching rules (intervals) configured on this circuit
100 A set of logical OR gates, computing the logical OR of each bit of the key-segment with the is_terminating input flag
101 An interval calculator-specific search-key segment, which locks to the highest value when the is_terminating input flag is set
102 Logic representing a key-decode process to transform the binary search key segment into unary forms amenable to further processing, doing any interval calculator work that can be done without the memory element read data, in parallel to the memory element access
104 A memory element whose depth is proportional to the interval capacity of the interval matching circuit and is addressed by the entry_ptr bus
106 A data bus representing the decoded search key in representation output from the key-decode logic
108a Data representing edges or a sub-sampling of edges within the context provided by the input entry_ptr signal
108b Data representing a base or bases within the context provided by the input entry_ptr signal
112 Logic to determine the next_is_terminating signal as described in the operation section 112 Logic to determine the next_entry signal as described in the operation section 900 Visual depiction of the value space associated with a section, this one a section crafted by the second key-segment. Since this example only has two interval calculators associated with it, this is the bottom section. Because the number of bits of the second segment is two, the bottom sections divide each top section into 4 parts 902 Visual depiction of the value space associated with a section, this section is crafted by the first key-segment. Since this example only has two interval calculators associated with it, this is the top section. Because the number of bits of the first segment is two, the top sections divide the search-key's value space into 4 parts 904a Visual depiction of a rule (interval) that matches any search key from a value of "0" to a value of "1" inclusive, Activating Edge 0 and Activating Edge 2

904b Visual depiction of a rule (interval) that matches any search key from a value of "1" to a value of "12" inclusive, Activating Edge 1 and Activating Edge 13

904c Visual depiction of a rule (interval) that matches any search key from a value of "2" to a value of "5" inclusive, Activating Edge 2 and Activating Edge 6

904d Visual depiction of a rule (interval) that matches any search key from a value of "1" to a value of "4" inclusive, Activating Edge 1 and Activating Edge 5

906a Visual depiction of the Regions carved out by the edges of the configured rules; this Region is the lowest valued Region named Region 0.

906b Visual depiction of the Regions carved out by the edges of the configured rules, this Region is named Region 1

906c Visual depiction of the Regions carved out by the edges of the configured rules, this Region is named Region 2

906d Visual depiction of the Regions carved out by the edges of the configured rules, this Region is named Region 3

906e Visual depiction of the Regions carved out by the edges of the configured rules, this Region is named Region 4

906f Visual depiction of the Regions carved out by the edges of the configured rules; this Region is the highest valued Region named Region 5

908 The sixteen values that compose this example search-key's value space; the values are aligned to the sections within which they reside

DETAILED DESCRIPTION

The following description refers to several figures. Throughout the description and figures, the same or similar elements are referred to with common reference symbols.

FIG. 1 is a top level schematic of the interval matching circuit. The search-key bus 20 inputted to the interval matching circuit is k-bits wide. These k-bits are broken into n contiguous segments. Each segment bus 22a, 22b, 22c may contain a varying number of bits according to the specific implementation of the circuit. For simplicity, the schematic shows each segment bus 22a, 22b, 22c to be of equal width, m, such that n times m equals k. The hardware elements in FIG. 1 will scale linearly with the number of segments 22a, 22b, 22c chosen by the specific implementation. Each segment bus 22a, 22b, 22c is routed to a respective set of FIFOs 24a, 24b, 24c of configurable depth. The depth will be configured for each FIFO 24a, 24b, 24c by a programming agent as described in the Operation section. Segments 26a, 26b, 26c de-queued from the FIFOs 24a, 24b, 24c, now temporally skewed, are input to a set of interval calculators 32a, 32b, 32c. The details of the interval calculator 32 are illustrated in FIG. 2.

The interval calculators 32 take the key segment bits 26 and logically OR 100 each bit with a single 1-bit termination flag 34. The OR 100 output 101 is the search-key segment for this interval calculator 32. This search-key segment 101 is input to a key decode logic block 102. This block 102 will output a bus 106 with two different encodings of the original segment 101. These encodings 106 are a hot-one-encoded representation as well as a thermometer-encoded representation. Both representations 106 are sent to a logic block "terminating logic" 110 and to a data-path block "pointer arithmetic" 112 for final interval calculation. To complete the interval calculation, both blocks 110, 112 require additional information. Accordingly a context pointer 36, which represents a set of possible matching intervals reduced by the interval calculations 32a, 32b previous to this one 32c, is provided as a read address to a memory element 104 resulting in data 108a, 108b. This memory element 104 need only be twice as deep as the total number of supported rules (intervals). So if the circuit's rule capacity is d, the depth of the memory element 104 is 2d. The reason for this is further explained in the Operation section. The data 108a, 108b is composed of an edge representation portion 108a and a base value portion 108b. The edge representation 108a is input to the terminating logic 110 while both portions 108a, 108b are input to the pointer arithmetic 112.

The function of the terminating logic 110 and the pointer arithmetic 112 follows. The edge representation 108a is an ordered set of $2^m$ bits. The base representation 108b is o-bits wide, with o equal to log base 2 of 2d. The pointer arithmetic 112 returns a next entry pointer 36b for the next interval calculator 32 equal to the value produced by the following steps: (1) start with a value of zero; (2) add an offset value 109 computed as follows: for each edge representation 108a bit position less than the value of the segment 106, but greater than zero, add the bit value at that position; (3) add the base value 108b. The terminating logic 110 returns true on a next termination flag 34 if and only if at least one of the following conditions hold true:

1) the original termination flag 34a has been set;

2) edge bus 108a has a false value at the bit position equal to the value of the segment 101;

3) both of the following conditions hold:
   a) the value of the offset bus 109 is equal to zero;
   b) the zero bit position of the edge representation 108a is equal to zero.

The value of the offset bus 109 is sent to the terminating logic 110 from the pointer arithmetic 112. The computation of 36b is easier with the segment value already in a thermometer-encoded representation 106. The computation of 34b is easier with the segment value already in a hot-one-encoded representation 106.

For further illustration, one may write both calculations more formally with Boolean logic. Let B be the edge representation 108a in binary and V be the segment value 106 in thermometer-encoded form, such that $B_i$ and $V_i$ represent the value of the i-th bit of the respective signals. Let T be the input termination flag 34a. The following logic is used to compute the offset 109, the next entry pointer 36, and the next is_terminating flag, $T_{next}$ 34.

$$\text{offset} = \sum_{i=0}^{2^m-1} B_{i+1} \wedge V_i$$

next_entry_ptr=offset+base $T_{next} = [\neg B_0 \hat{\ }(\text{offset}=0)] \vee \neg B_V \vee T$ FIG. 1 specifies how the interval calculators 32a, 32b, 32c interconnect using their termination flags 34a, 34b, 34c and their entry pointers 36a, 36b, 36c. The first interval calculator 32a receives a termination flag of zero 30 and an entry pointer of zero 30. After some fixed latency the interval calculator 32a computes the next termination flag 34a and the next entry pointer 36a. The FIFO 24b introduces a commensurate latency for the search-key segment 26b such that the second interval computation 32b occurs with all inputs ready and synchronized. The next interval computation 32b also calculates the next termination flag 34b and the next entry pointer 36b and the process cascades to the next interval calculator. The process continues through other interval calculators 28b until all k-bits are used. The final next entry pointer 36d represents all matching intervals.

FIG. 3 illustrates an example set of rules for k equal to 4, m equal to 2, and n equal to 2. The first interval calculator 32a considers the Top Sections 902 while the second interval calculator 32b considers the Bottom Sections 900. Each of rules' 904a, 904b, 904c, 904d range boundaries create Regions 906a, 906b, 906c, 906d, 906e, 906f of the search-keys value space. The location of these search-key value sub-spaces 906a, 906b, 906c, 906d, 906e, 906f is used to program the memory elements 104 as detailed in the Operation Section.

Advantages

Because there are no loops in the flow of data in this circuit, it may be arbitrarily pipelined until the memory element 104 contains the time critical path. This allows very high bandwidth processing of search requests, where only a memory lookup limits the circuit's cycle time. The absence of conditional logic and the absence of data-flow loops deliver a constant search bandwidth capacity irrespective of the actual requests made.

Because the number of interval calculators 32 scales linearly with search-key width 20, and the depth of the memory elements 104 scale linearly with interval capacity, the entire circuit scales linearly.

Because the circuit uses only standard logic and standard memory, it need only consume power commensurate with standard-switching logic.

Because the specified hardware resources make no assumptions about the rules (intervals) with which they will be configured to search, the present circuit will deliver a constant capacity of configurable rules, irrespective of the actual rules specified.

Operation

To operate the circuit correctly, the memory elements 104 must be configured and the FIFO depths 32a, 32b, 32c set. These configurations will be determined by the search-key segmentation scheme 26 chosen, as well as the intervals (rules) used at any given time. Therefore as the intervals change, the content of the memory elements 104 must change as well.

The depth of a particular FIFO is set to equal the aggregate latency of the interval calculators 24 that precede it. For example, FIFO[0] 24c should delay the final segment 22c by the latency from interval calculator[n−1] 32a to interval calculator[1] 32c.

Configuring the memory elements 104 requires further illustration. Consider first a simple example illustrated in FIG. 3. For this example, let n equal 2, m equal 2, and k equal 4. Four intervals 904a, 904b, 904c, 904d define 8 edges and 6 Regions 906a, 906b, 906c, 906d, 906e, 906f. A Region exactly identifies the set of intervals that are satisfied by any value within that Region. Therefore, the interval matching problem can be formulated as finding the Region of the search-key value space to which the search-key belongs. To specify this formulation, it is useful to label and define Edges, groups of Edges, Rules, and Regions, and Entries as follows.

Edge Names

As illustrated in FIG. 4, a k-bit search-key allows $2^k$ possible search-key values 958. There are $2^k+1$ unique boundary lines 950 that can be drawn around these values 952. Each of these will be called an "Edge" 950. By convention, an Edge 950 will be named with the greater of the two values 958 it straddles, e.g. the boundary line 950 between 2 and 3 will be named "Edge 3."

Naming Groups of Edges

Groups of Edges can be named as well. Edges from Edge 0 to Edge $2^k-1$ can be named with k-bits. The following notation names a group of Edges by referencing common bits of the Edges' names in binary. The notation concatenates binary segments together by use of periods, "."; the Edge names are segmented at the same locations that the search-key is segmented 22a, 22b, 22c. Additionally, the use of the wildcard symbol asterisk, "*", denotes any value for all remaining bits. For example, a search-key split into three segments could name the following groups of edges:

| Edge Name | Reference |
| --- | --- |
| 12.131.5 | Refers to all edge names with 12 as its first segment's value, and 131 as its second segment's value, and 5 as its third segment value. |
| 12.13.* | Refers to all edge names with 12 as its first segment's value, and 13 as its second segment's value. |
| 3.* | Refers to all edge names with 3 as its first segment's value. |

For a given configuration of the circuit, every Edge will be programmed to be ON or OFF. Programming the edge in the ON position will be referred to as "activating" that edge.

Naming Regions

To configure a set of intervals (inclusive ranges), we must activate a number of Edges. All Edges begin in the off position, except Edge 0 and Edge $2^k$ which are always ON. For each interval configured two Edges will be activated. Activating an Edge that is already ON has no effect. For example processing the following three rules in order would produce the following activations:

| Interval | Activation |
| --- | --- |
| Range 5–6 | activates Edge 5 and activates Edge 7 |
| Range 0–5 | activates Edge 6 |
| Range 12–$2^k$ | activates Edge 12 |

Once all the intervals have been so processed, a set of "Regions" 906a, 906b, 906c, 906d, 906e, 906f will be cut out of the search-key's value space, as illustrated with a particular example on FIG. 3. With no edges activated, one single Region is defined. With every new edge put in the ON position from the OFF position, a new Region will be defined. Regions are named in ascending order from Edge 0. The first Region, which always exists, is named Region 0 906a. The next Region, if it exists, is named Region 1 906b. And so on, until each of the search-key's possible values has a unique Region associated with it.

It is useful to define a Boolean function "Active," having a domain of all possible Edges in the value space. If E is an Edge, then Active(E) will return true if and only if the Edge E is ON.

Naming Memory Entries

The following notation names each entry in every memory element 104. We label an "Entry" with the search-key value space that the Entry represents. We segment this identifier if the same way the search-key is segmented. Let the variables m[0], m[1], m[2], m[3], m[n−1] represent the bit width of the first, second, third, . . . , n-th segment respectively. Accordingly, m[0]+m[1]+m[2]+m[3]+ . . . +m[n−1]=k. Then, the first segment divides the value space into $2^{m[0]}$ equal "Sections" of range $2^k/2^{m0}$. Next, the second segment divides these Sections into $2^{m[1]}$ smaller, equal Sections of range $2^k/2^{m[0]+m[1]}$. This continues with all n segments. So, an Entry with the name a[1].a[2].a[3] . . . a[i] would represent a value space specified by the a[1]-th Section of first set of divisions, the a[2]-th Section of the second set of divisions (within the a[1]-th Section), and so on until the a[i]-th Section of the i-th set of divisions is specified. Finally, an Entry will exist in these memories if and only if there is an Active Edge in the value space it represents.

Configuring the Memory Element

To configure the memory elements 104, it is useful to understand how the circuit will traverse the search-key's value space 958, identifying the Region to which the input value belongs. Consider a simple example illustrated in FIG. 3. For this example, let n equal 2, m equal 2, and k equal 4 The circuit will consider a four (since m equals 2) times sub-sampled value space with the first interval calculator and the full precision value space with the second interval calculator. Consequently, the first interval calculator will divide the search-key's value space into four parts, each marked with Top Section 902. There are four bits of edge representation data 108a in the first memory element's 104 only entry, where 3 bits will be set since those sections contain edges. Based on the value of the segment a certain offset 109 will be added to a base 108b of zero and provide a pointer 36 to the next interval calculator 32. The second memory element 104 will have three entries, corresponding to the three set bits of the previous memory element. Each of these entries will have four bits of edge data representation 108a configured as set or as unset based on the presence of edges within their representative value spaces. The final summation of offset 109 with base 108b will produce a Region identifier.

Using the terms defined above, the following specifies how to configure the memory elements 104 for a particular set of intervals. This requires configuring the edge representation 108a and the base representation 108b of all the entries of all the memory elements.

To configure the edge representation 108a of the j-th Entry of the i-th memory element 104 in the i-th interval calculator 32, the Active Edges in the search-key's value space are considered. For each Section of the value subspace that the i-th interval calculator and the j-th Entry represent, there is an edge representation 108a bit. This bit is 1 if and only if there are any Active Edges in the Section it represents. For example in a third interval calculator 32, the following table is used to configure the j-th Entry's edge representation 108a. We will label this example Entry with P.Q. P and Q represent the Section numbers of the first two segments linking us to the j-th Entry of the i-th memory element 104. The edge representation 108a would be programmed as follows:

| Edge Representation Bit | Value |
| --- | --- |
| ER[0] | Active(P.Q.0.*) |
| ER[1] | Active(P.Q.1.*) |
| ER[2] | Active(P.Q.2.*) |
| ER[3] | Active(P.Q.3.*) |
| . . . | . . . |
| $ER[2^{m[2]} - 1]$ | $Active(P.Q.2^{m[2]} - 1.*)$ |

An Entry will exist if and only if at least one of its edge representation 108a bits is Active. So if Entry P.Q exists, then one of these bits must be set.

To configure the base representation 108b, the Region of the search-key's value space must be considered. For the n-th memory element 104, the value of each Entry's base representation 108b equals the Region of lowest value present in the Section that the Entry represents (even when the Section contains a partial amount of a Region). Likewise, for the (n−1)-th memory element 104, the value of each Entry's base representation 108b equals an address of a corresponding Entry in n-th memory element 104. This corresponding Entry is the one whose Section has the lowest value also present the Section represented by the (n−1)-th memory element's Entry (again, even if the Section is only partially represented).

Interval Matching

After configuring the memory elements 104 and FIFO 24a, 24b, 24c depths for a given set of intervals as described above, interval match requests may be input to the circuit of the search-key bus 20. After a fixed latency, equal to the latency through the first FIFO 24a plus the latency of all interval calculators 32, the final next entry bus 36d uniquely identifies the set of satisfied intervals.

CONCLUSION, RAMIFICATIONS, AND SCOPE

Thus the reader will see that any set of d intervals may be configured using the present invention and that any given search will be processed with equal speed. The reader will then also see that the present invention can be grown to any k and d size linearly. The present invention will allow interval matching to be performed in hardware systems when constraints on speed, power, or area were previously prohibitive.

Although the invention has been described in connection with a specific embodiment, it is understood that this invention is not limited to the embodiments disclosed, but is capable of various modifications, for example: varying pipelining, alternate FIFO topologies, non-uniform key segment sizes, varying memory element type and/or size such as multiple DRAM modules or a small SRAM, mapping parts of the hardware design onto programmable hardware such as FPGAs, or alternate data representation in memory elements, which would be apparent to one of ordinary skill in the art. Thus, the invention is limited only by the following claims and their legal equivalents.

I claim:

1. A scalable, interval matching circuit, comprising:
 a. an input terminal, configured to receive data representing an ordered k-bit input group, the input bit group having n contiguous segments,
 b. a configurable queuing means for receiving said contiguous segments and independently delaying each of the segments by different preconfigured amounts, producing an ordered k-bit group of delayed segments,
 c. an ordered set of interval calculators, each of the interval calculators accessing a configurable memory element, decode and arithmetic logic, such that each of said interval calculators will receive, according to order number, one of the said delayed segments, and each said interval calculator will:
  i. receive an o-bit entry_ptr field signal,
  ii. produce an o-bit next_entry_ptr signal,
 d. a means for ordered interconnection of said interval calculators, so as to connect each said next_entry_ptr output to the neighboring entry_ptr input,
 e. a means to configure said configurable queuing means and the configurable memory elements of said interval calculators,
 f. an output terminal producing data representing a value uniquely identifying the interval or intervals matched by said k-bit input group.

2. The circuit of claim 1, wherein said configurable queuing means stores n configurable values to delay the n said segments by said configurable values.

3. The circuit of claim 1, wherein each said configurable memory element holds data representing a base or bases and data representing the presence of an edge or edges.

4. The circuit of claim 1, wherein said ordered set of interval calculators perform interval matching operations with a progressively higher precision within the value space of the search-key.

5. The circuit of claim 1, wherein the calculation of next_entry_pointer is performed by forming an offset, through consideration of the data representing the presence of an edge or edges and the delayed segment, and by adding the offset to the data representing a base.

6. A circuit method to compact memory usage in interval matching circuits, matching Regions to a search-key by use of an algorithmic tree over edges, comprising:
 a. an additional signal, next_is_terminating, produced with logic for every level of tree processing,
 b. an additional signal, is_terminating, input to logic for every level of tree processing
 c. additional logic to modify portions of the search-key upon encountering the is_terminating signal at a tree processing level,
 d. an interconnecting of the next_is_terminating output signal of one tree processing level to the is_terminating input signal of another tree processing level,
 whereby said circuit method, by mapping different search-keys to the same value when they produce the same interval matches, decreases the amount of memory otherwise required in the interval matching circuits.

* * * * *